United States Patent
Zhang et al.

(10) Patent No.: US 10,721,155 B2
(45) Date of Patent: Jul. 21, 2020

(54) PACKET TRANSMISSION METHOD AND APPARATUS

(71) Applicant: Huawei Technologies Co., Ltd., Shenzhen, Guangdong (CN)

(72) Inventors: Xudong Zhang, Beijing (CN); Chao He, Beijing (CN); Yong Liu, Beijing (CN); Xue Yang, Beijing (CN); Bo Xie, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/998,596

(22) Filed: Aug. 16, 2018

(65) Prior Publication Data

US 2018/0367439 A1 Dec. 20, 2018

Related U.S. Application Data

(63) Continuation of application No. PCT/CN2017/073502, filed on Feb. 14, 2017.

(30) Foreign Application Priority Data

Feb. 16, 2016 (CN) .......................... 2016 1 0088116

(51) Int. Cl.
  *H04L 12/751* (2013.01)
  *H04L 12/26* (2006.01)
  *H04L 12/721* (2013.01)

(52) U.S. Cl.
  CPC .............. *H04L 45/02* (2013.01); *H04L 43/10* (2013.01); *H04L 45/34* (2013.01)

(58) Field of Classification Search
  CPC .................................. H04L 45/02; H04L 43/10
  See application file for complete search history.

(56) References Cited

U.S. PATENT DOCUMENTS 7,778,393 B2 *  8/2010  Ethier ..................... H04L 43/00
                                                           379/112.06
7,843,838 B1 * 11/2010  Huang .................... H04L 43/10
                                                             370/241.1

(Continued)

FOREIGN PATENT DOCUMENTS

| CN | 101175237 A | 5/2008 |
|---|---|---|
| CN | 101282241 A | 10/2008 |
| CN | 102082782 A | 6/2011 |

OTHER PUBLICATIONS

Ramesh Govindan, "Heuristics for Internet Map Discovery", IEEE INFOCOM 2000, Mar. 26-30, 2000, p. 1371-1380, XP1044231.

(Continued)

*Primary Examiner* — Rasheed Gidado
(74) *Attorney, Agent, or Firm* — Conley Rose, P.C.

(57) ABSTRACT

This application discloses a packet transmission method and apparatus, to help trace a source router generating a routing information update packet, so as to improve network maintenance efficiency and shorten failure duration. The method includes: generating, by a first router, a first routing information update packet; generating, by the first router, a first source-tracing packet, where the first source-tracing packet is used to indicate that the first router is a source router generating the first routing information update packet; and determining, by the first router, that a second router adjacent to the first router has a source-tracing capability, and sending the first source-tracing packet to the second router.

20 Claims, 5 Drawing Sheets

(56) References Cited

U.S. PATENT DOCUMENTS

| | | | |
|---|---|---|---|
| 8,149,690 B1 | 4/2012 | Kakkar | |
| 9,344,349 B2* | 5/2016 | Ganichev | H04L 12/4633 |
| 2007/0025241 A1* | 2/2007 | Nadeau | H04L 12/4633 370/229 |
| 2009/0100298 A1* | 4/2009 | Lange | G06F 11/006 714/45 |
| 2009/0113070 A1* | 4/2009 | Mehta | H04L 41/06 709/238 |
| 2011/0317696 A1* | 12/2011 | Aldrin | H04L 12/1881 370/390 |
| 2013/0265881 A1 | 10/2013 | Filsfils et al. | |
| 2013/0336109 A1 | 12/2013 | Previdi et al. | |
| 2014/0293798 A1* | 10/2014 | Kang | H04L 43/10 370/241.1 |

OTHER PUBLICATIONS

Shouling Dong et al., "A Novel Algorithm of IPv6 Network Topology Discovery for Campus Network", 2011 IEEE International Conference on Computer Science and Service System, Jun. 27, 2011, p. 68-71, XP32005692.

F. Wei et al, "Purge Originator Identification TLV for IS-IS". RFC6232, May 2011, 6 pages.

T. Li et al, "Intermediate System to Intermediate System (IS-IS) Cryptographic Authentication". RFC3567, Jul. 2003, 6 pages.

T. Li et al, "IS-IS Cryptographic Authentication", RFC5304, Oct. 2008, 11 pages.

"Information technology—Telecommunications and information exchange between systems—Intermediate System to Intermediate System intra-domain routeing information exchange protocol for use in conjunction with the protocol for providing the connectionless-mode network service (ISO 8473)", ISO/IEC 10589, Second edition, Nov. 15, 2002 210 pages.

Shou-Ling, D., et al, "Distance-Based Integration Algorithm for Topology Discovery of IPv6 Campus Network," Journal of South China University of Technology (Natural Science Edition), Aug. 2012, 7 pages.

Foreign Communication From a Counterpart Application, Chinese Application No. 201610088116.4, Chinese Office Action dated Jun. 4, 2019, 5 pages.

* cited by examiner

PACKET TRANSMISSION METHOD AND APPARATUS

CROSS-REFERENCE TO RELATED APPLICATIONS

This application is a continuation of International Application No. PCT/CN2017/073502 filed on Feb. 14, 2017, which claims priority to Chinese Patent Application No. 201610088116.4 filed on Feb. 16, 2016. The disclosures of the aforementioned applications are hereby incorporated by reference in their entireties.

TECHNICAL FIELD

This application relates to the communications field, and in particular, to a packet transmission method and apparatus.

BACKGROUND

With development of network technologies, a client imposes a higher requirement on reliability and stability of Interior Gateway Protocol (IGP). The IGP protocol includes the Open Shortest Path First (OSPF) protocol and the Intermediate System to Intermediate System (IS-IS) protocol. In the OSPF protocol, neighbor information is sent to each node in an entire network by using a link-state advertisement (LSA), so that each node performs route calculation. In the IS-IS protocol, neighbor information is sent to each node in an entire network by using a link state PDU (LSP), so that each node performs route calculation. For ease of description, information such as the LSA and the LSP is collectively referred to as a routing information update packet. In a routing system, a routing information update packet generated by each node is flooded in the entire network, thereby affecting each node in the entire network. In addition, after receiving a routing information update packet, each node updates routing information based on the routing information update packet.

Currently, the OSPF/IS-IS protocol does not provide enough information about a source router generating a routing information update packet, and when route flapping occurs, a long time is required to determine a failure source. For example, a router supporting the IS-IS protocol is used as an example. The IS-IS protocol is a link-state routing protocol, and advertisement of a route in the entire network is implemented by using an LSP packet. After receiving a flooded LSP packet, each router needs to perform verification and detection. For an LSP packet in which an error is detected during verification, the router deletes a route to a source router of the LSP packet, generates a purge LSP packet, and floods the purge LSP packet in the entire network. The purge LSP packet is used to notify another router in the entire network that the source router of the LSP packet in which an error is detected during verification is abnormal, and the route is unreachable. After receiving the purge LSP packet, the another router performs an operation the same as that performed by the foregoing router. Consequently, route flapping occurs.

If a router is faulty or is attacked by a hacker, many purge LSP packets may be generated and flooded in an entire network, resulting in route flapping. If route flapping occurs, a router generating the purge LSP packets cannot be located, and therefore a failure source cannot be quickly located.

SUMMARY

Embodiments of this application provide a packet transmission method and apparatus, to help trace a source router generating a routing information update packet, so as to improve network maintenance efficiency and shorten failure duration.

An embodiment of this application provides a packet transmission method, and the method includes:

generating, by a first router, a first routing information update packet;

generating, by the first router, a first source-tracing packet, where the first source-tracing packet is used to indicate that the first router is a source router generating the first routing information update packet; and determining, by the first router, that a second router adjacent to the first router has a source-tracing capability, and sending the first source-tracing packet to the second router.

In the foregoing method, when or after generating the first routing information update packet, the first router may generate the first source-tracing packet. This helps a device receiving the first source-tracing packet trace the source router generating the first routing information update packet, thereby improving network maintenance efficiency and shortening failure duration.

Optionally, the method further includes:

determining, by the first router, that the second router does not have the source-tracing capability, and sending the first routing information update packet to the second router.

In the foregoing method, after determining that the second router does not have the source-tracing capability, the first router does not send the first source-tracing packet to the second router. This facilitates mutual compatibility between a router having the source-tracing capability and a router that does not have the source-tracing capability, thereby improving device utilization.

Optionally, the determining, by the first router, that a second router adjacent to the first router has a source-tracing capability includes:

sending, by the first router, a first source-tracing capability negotiation packet to the second router, where the first source-tracing capability negotiation packet is used to query whether the second router has the source-tracing capability; and after receiving a first source-tracing capability acknowledgement packet sent by the second router, determining, by the first router, that the second router has the source-tracing capability, where the first source-tracing capability acknowledgement packet is used to indicate that the second router has the source-tracing capability.

In the foregoing method, the first router can learn whether the second router has the source-tracing capability. This facilitates mutual compatibility between a router having the source-tracing capability and a router that does not have the source-tracing capability, thereby improving device utilization.

Optionally, before the sending, by the first router, a first source-tracing capability negotiation packet to the second router, the method further includes:

sending, by the first router, the first source-tracing capability negotiation packet to the second router if the first router determines that duration between a moment of sending a third source-tracing capability negotiation packet to the second router in a previous period and a moment of generating the first source-tracing packet exceeds preset duration, where the preset duration is duration corresponding to one period, and the third source-tracing capability negotiation packet is used to query whether the second router has the source-tracing capability.

In the foregoing method, the first router may not need to frequently send, to the second router, a source-tracing capability negotiation packet for querying whether the second router has the source-tracing capability. This helps improve network efficiency.

Optionally, after the sending the first source-tracing packet to the second router, the method further includes:

sending, by the first router, a fourth source-tracing capability negotiation packet to the second router if the first router determines that the duration between the moment of sending the third source-tracing capability negotiation packet to the second router in the previous period and the moment of generating the first source-tracing packet exceeds the preset duration, where both the third source-tracing capability negotiation packet and the fourth source-tracing capability negotiation packet are used to query whether the second router has the source-tracing capability.

In the foregoing method, the first router can accurately update a source-tracing capability of the second router in real time.

Optionally, the method further includes:

receiving, by the first router, a second source-tracing capability negotiation packet sent by a third router, where the second source-tracing capability negotiation packet is used to query whether the first router has the source-tracing capability; and sending, by the first router, a second source-tracing capability acknowledgement packet to the third router, where the second source-tracing capability acknowledgement packet is used to indicate that the first router has the source-tracing capability.

In the foregoing method, the first router notifies, by sending the second source-tracing capability acknowledgement packet, that the first router has the source-tracing capability. The third router is a router adjacent to the first router. The third router may be a router the same as the second router or a router different from the second router.

Optionally, after the sending, by the first router, a second source-tracing capability acknowledgement packet to the third router, the method further includes:

receiving, by the first router, a second routing information update packet and a second source-tracing packet that are sent by the third router, where the second source-tracing packet is used to indicate a source router generating the second routing information update packet; and determining, by the first router based on the second source-tracing packet, the source router generating the second routing information update packet.

Optionally, the method further includes:

receiving, by the first router, a third routing information update packet sent by a fourth router;

determining, by the first router, that the fourth router does not have the source-tracing capability and a fifth router adjacent to the first router has the source-tracing capability, and generating a first source-tracing assistance packet, where the first source-tracing assistance packet is used to indicate that the fourth router is a source router generating the third routing information update packet; and sending, by the first router, the first source-tracing assistance packet to the fifth router.

In this method, after the fourth router that does not have the source-tracing capability generates a routing information update packet, a router that is adjacent to the fourth router and that has the source-tracing capability, for example, the first router, may generate a source-tracing assistance packet such as the first source-tracing assistance packet. This helps another router quickly locate a router that does not have the source-tracing capability, and a router having the source-tracing capability and the router that does not have the source-tracing capability can be compatible with each other. The fifth router may be a router the same as the second router or a router different from the second router. The fourth router may be a router the same as the third router or a router different from the third router.

Optionally, the method further includes:

receiving, by the first router, a third routing information update packet sent by a fourth router;

determining, by the first router, that a fifth router adjacent to the first router has the source-tracing capability, and generating a first source-tracing assistance packet, where the first source-tracing assistance packet is used to indicate that the fourth router is a source router generating the third routing information update packet; and sending, by the first router, the first source-tracing assistance packet to the fifth router.

In this method, if the first router does not determine whether the fourth router has the source-tracing capability, before the first router receives a source-tracing packet from the fourth router, the first router may generate the first source-tracing assistance packet. This helps another router quickly locate a router for which whether the router has the source-tracing capability is not determined. The fifth router may be a router the same as the second router or a router different from the second router.

Optionally, the method further includes:

obtaining, by the first router, a second source-tracing assistance packet and a third source-tracing packet, where the second source-tracing assistance packet is used to indicate that a sixth router is a source router generating a fourth routing information update packet, and the third source-tracing packet is used to indicate that a seventh router is the source router generating the fourth routing information update packet; and determining, by the first router based on the third source-tracing packet, that the source router generating the fourth routing information update packet is the seventh router.

In the foregoing solution, when receiving a source-tracing packet and a source-tracing assistance packet, the first router preferentially determines, based on the source-tracing packet, a source router generating a routing information update packet, so that the accurate source router is determined. In this solution, when a source-tracing packet and a source-tracing assistance packet that are corresponding to a same routing information update packet indicate different source routers generating the routing information update packet, a router can accurately determine a source router generating the routing information update packet, so that a router having the source-tracing capability and a router that does not have the source-tracing capability coexist.

An embodiment of this application provides a packet transmission method, and the method includes:

receiving, by a second router, a first source-tracing packet sent by a first router, where the first source-tracing packet is used to indicate that the first router is a source router generating a first routing information update packet; and determining, by the second router, that a third router adjacent to the second router has a source-tracing capability, and sending the first source-tracing packet to the third router.

In the foregoing method, after receiving the first source-tracing packet, the second router determines that the first router is the source router generating the first routing information update packet. The second router may forward the received first source-tracing packet to a router that is adjacent to the second router and that has the source-tracing capability. This helps flood the first source-tracing packet in an entire network, so that another router can accurately trace the source router generating the first routing information update packet, thereby improving network maintenance efficiency and shortening failure duration.

Optionally, the method further includes:

determining, by the second router, that the third router does not have the source-tracing capability, and sending the first routing information update packet to the third router.

Optionally, the method further includes:

receiving, by the second router, a second routing information update packet sent by a fourth router;

determining, by the second router, that the fourth router does not have the source-tracing capability and a fifth router adjacent to the second router has the source-tracing capability, and generating a first source-tracing assistance packet, where the first source-tracing assistance packet is used to indicate that the fourth router is a source router generating the second routing information update packet; and sending, by the second router, the first source-tracing assistance packet to the fifth router.

Optionally, the method further includes:

receiving, by the second router, a second routing information update packet sent by a fourth router;

determining, by the second router, that a fifth router adjacent to the second router has the source-tracing capability, and generating a first source-tracing assistance packet, where the first source-tracing assistance packet is used to indicate that the fourth router is a source router generating the second routing information update packet; and sending, by the second router, the first source-tracing assistance packet to the fifth router.

Optionally, the method further includes:

receiving, by the second router, a second source-tracing assistance packet and a second source-tracing packet, where the second source-tracing assistance packet is used to indicate that a sixth router is a source router generating a fourth routing information update packet, and the second source-tracing packet is used to indicate that a seventh router is the source router generating the fourth routing information update packet; and determining, by the second router based on the second source-tracing packet, that the source router generating the fourth routing information update packet is the seventh router.

An embodiment of this application provides a packet transmission apparatus, the apparatus is disposed in a first router, and the apparatus includes:

a first packet generation unit, configured to generate a first routing information update packet;

a second packet generation unit, configured to generate a first source-tracing packet, where the first source-tracing packet is used to indicate that the first router is a source router generating the first routing information update packet; and a transceiver unit, configured to: determine that a second router adjacent to the apparatus has a source-tracing capability, and send the first source-tracing packet to the second router.

Optionally, the transceiver unit is further configured to:

determine that the second router does not have the source-tracing capability, and send the first routing information update packet to the second router.

Optionally, the transceiver unit is specifically configured to:

send a first source-tracing capability negotiation packet to the second router, where the first source-tracing capability negotiation packet is used to query whether the second router has the source-tracing capability; and after receiving a first source-tracing capability acknowledgement packet sent by the second router, determine that the second router has the source-tracing capability, where the first source-tracing capability acknowledgement packet is used to indicate that the second router has the source-tracing capability.

Optionally, the transceiver unit is further configured to:

send the first source-tracing capability negotiation packet to the second router if the duration between a moment of sending a third source-tracing capability negotiation packet to the second router in a previous period and a moment of generating the first source-tracing packet exceeds preset duration, where the preset duration is duration corresponding to one period, and the third source-tracing capability negotiation packet is used to query whether the second router has the source-tracing capability.

Optionally, the transceiver unit is further configured to:

send a fourth source-tracing capability negotiation packet to the second router if the duration between the moment of sending the third source-tracing capability negotiation packet to the second router in the previous period and the moment of generating the first source-tracing packet exceeds the preset duration, where both the third source-tracing capability negotiation packet and the fourth source-tracing capability negotiation packet are used to query whether the second router has the source-tracing capability.

Optionally, the transceiver unit is further configured to:

receive a second source-tracing capability negotiation packet sent by a third router, where the second source-tracing capability negotiation packet is used to query whether the first router has the source-tracing capability; and send a second source-tracing capability acknowledgement packet to the third router, where the second source-tracing capability acknowledgement packet is used to indicate that the first router has the source-tracing capability.

Optionally, the transceiver unit is further configured to:

receive a second routing information update packet and a second source-tracing packet that are sent by the third router, where the second source-tracing packet is used to indicate a source router generating the second routing information update packet; and determine, based on the second source-tracing packet, the source router generating the second routing information update packet.

Optionally, the transceiver unit is configured to receive a third routing information update packet sent by a fourth router;

the second packet generation unit is configured to: determine that the fourth router does not have the source-tracing capability and a fifth router adjacent to the apparatus has the source-tracing capability, and generate a first source-tracing assistance packet, where the first source-tracing assistance packet is used to indicate that the fourth router is a source router generating the third routing information update packet; and the transceiver unit is configured to send the first source-tracing assistance packet to the fifth router.

Optionally, the transceiver unit is further configured to:

obtain a second source-tracing assistance packet and a third source-tracing packet, where the second source-tracing assistance packet is used to indicate that a sixth router is a source router generating a fourth routing information update packet, and the third source-tracing packet is used to indicate that a seventh router is the source router generating the fourth routing information update packet; and determine, based on the third source-tracing packet, that the source router generating the fourth routing information update packet is the seventh router.

An embodiment of this application provides a packet transmission apparatus, the apparatus is disposed in a second router, and the apparatus includes:

a receiving unit, configured to receive a first source-tracing packet sent by a first router, where the first source-tracing packet is used to indicate that the first router is a source router generating a first routing information update packet; and a sending unit, configured to: determine that a third router adjacent to the apparatus has a source-tracing capability, and send the first source-tracing packet to the third router.

Optionally, the sending unit is further configured to:

determine that the third router does not have the source-tracing capability, and send the first routing information update packet to the third router.

Optionally, the apparatus further includes a packet generation unit;

the receiving unit is configured to receive a second routing information update packet sent by a fourth router;

the packet generation unit is configured to: determine that the fourth router does not have the source-tracing capability and a fifth router adjacent to the apparatus has the source-tracing capability, and generate a first source-tracing assistance packet, where the first source-tracing assistance packet is used to indicate that the fourth router is a source router generating the second routing information update packet; and the sending unit is configured to send the first source-tracing assistance packet to the fifth router.

Optionally, the apparatus further includes a packet generation unit;

the receiving unit is configured to receive a second routing information update packet sent by a fourth router;

the packet generation unit is configured to: determine that a fifth router adjacent to the apparatus has the source-tracing capability, and generate a first source-tracing assistance packet, where the first source-tracing assistance packet is used to indicate that the fourth router is a source router generating the second routing information update packet; and the sending unit is configured to send the first source-tracing assistance packet to the fifth router.

Optionally, the receiving unit is further configured to:

receive a second source-tracing assistance packet and a second source-tracing packet, where the second source-tracing assistance packet is used to indicate that a sixth router is a source router generating a fourth routing information update packet, and the second source-tracing packet is used to indicate that a seventh router is the source router generating the fourth routing information update packet; and determine, based on the second source-tracing packet, that the source router generating the fourth routing information update packet is the seventh router.

An embodiment of this application provides a packet transmission apparatus, the apparatus is disposed in a first router, the apparatus includes a processor, a communications interface, and a memory storing a program, and the processor reads an instruction corresponding to the program from the memory, to perform the following operations:

generating, by the processor, a first routing information update packet;

generating, by the processor, a first source-tracing packet, where the first source-tracing packet is used to indicate that the first router is a source router generating the first routing information update packet; and determining, by the processor, that a second router adjacent to the apparatus has a source-tracing capability, and sending the first source-tracing packet to the second router by using the communications interface.

Optionally, the processor further determines that the second router does not have the source-tracing capability, and sends the first routing information update packet to the second router by using the communications interface.

Optionally, the processor is specifically configured to:

send a first source-tracing capability negotiation packet to the second router by using the communications interface, where the first source-tracing capability negotiation packet is used to query whether the second router has the source-tracing capability; and after receiving, by using the communications interface, a first source-tracing capability acknowledgement packet sent by the second router, determine that the second router has the source-tracing capability, where the first source-tracing capability acknowledgement packet is used to indicate that the second router has the source-tracing capability.

Optionally, the processor is further configured to send the first source-tracing capability negotiation packet to the second router by using the communications interface if the duration between a moment of sending a third source-tracing capability negotiation packet to the second router in a previous period and a moment of generating the first source-tracing packet exceeds preset duration, where the preset duration is duration corresponding to one period, and the third source-tracing capability negotiation packet is used to query whether the second router has the source-tracing capability.

Optionally, the processor is further configured to send a fourth source-tracing capability negotiation packet to the second router by using the communications interface if the duration between the moment of sending the third source-tracing capability negotiation packet to the second router in the previous period and the moment of generating the first source-tracing packet exceeds the preset duration, where both the third source-tracing capability negotiation packet and the fourth source-tracing capability negotiation packet are used to query whether the second router has the source-tracing capability.

Optionally, the processor is further configured to:

receive, by using the communications interface, a second source-tracing capability negotiation packet sent by a third router, where the second source-tracing capability negotiation packet is used to query whether the first router has the source-tracing capability; and send a second source-tracing capability acknowledgement packet to the third router by using the communications interface, where the second source-tracing capability acknowledgement packet is used to indicate that the first router has the source-tracing capability.

Optionally, the processor is further configured to:

receive, by using the communications interface, a second routing information update packet and a second source-tracing packet that are sent by the third router, where the second source-tracing packet is used to indicate a source router generating the second routing information update packet; and determine, based on the second source-tracing packet, the source router generating the second routing information update packet.

Optionally, the processor is further configured to:

receive, by using the communications interface, a third routing information update packet sent by a fourth router;

determine that the fourth router does not have the source-tracing capability and a fifth router adjacent to the apparatus has the source-tracing capability, and generate a first source-tracing assistance packet, where the first source-tracing assistance packet is used to indicate that the fourth router is a source router generating the third routing information update packet; and send the first source-tracing assistance packet to the fifth router by using the communications interface.

Optionally, the processor is further configured to:

obtain a second source-tracing assistance packet and a third source-tracing packet, where the second source-tracing assistance packet is used to indicate that a sixth router is a source router generating a fourth routing information update packet, and the third source-tracing packet is used to indicate that a seventh router is the source router generating the fourth routing information update packet; and determine, based on the third source-tracing packet, that the source router generating the fourth routing information update packet is the seventh router.

An embodiment of this application provides a packet transmission apparatus, the apparatus includes a processor, a communications interface, and a memory storing a program, and the processor reads an instruction corresponding to the program from the memory, to perform the following operations:

receiving, by using the communications interface, a first source-tracing packet sent by a first router, where the first source-tracing packet is used to indicate that the first router is a source router generating a first routing information update packet; and determining that a third router adjacent to the apparatus has a source-tracing capability, and sending the first source-tracing packet to the third router by using the communications interface.

Optionally, the processor is further configured to: determine that the third router does not have the source-tracing capability, and send the first routing information update packet to the third router by using the communications interface.

Optionally, the processor is further configured to:

receive, by using the communications interface, a second routing information update packet sent by a fourth router;

determine that the fourth router does not have the source-tracing capability and a fifth router adjacent to the apparatus has the source-tracing capability, and generate a first source-tracing assistance packet, where the first source-tracing assistance packet is used to indicate that the fourth router is a source router generating the second routing information update packet; and send the first source-tracing assistance packet to the fifth router by using the communications interface.

Optionally, the processor is further configured to:

receive, by using the communications interface, a second routing information update packet sent by a fourth router;

determine that a fifth router adjacent to the apparatus has the source-tracing capability, and generate a first source-tracing assistance packet, where the first source-tracing assistance packet is used to indicate that the fourth router is a source router generating the second routing information update packet; and send the first source-tracing assistance packet to the fifth router by using the communications interface.

Optionally, the processor is further configured to:

receive a second source-tracing assistance packet and a second source-tracing packet by using the communications interface, where the second source-tracing assistance packet is used to indicate that a sixth router is a source router generating a fourth routing information update packet, and the second source-tracing packet is used to indicate that a seventh router is the source router generating the fourth routing information update packet; and determine, based on the second source-tracing packet, that the source router generating the fourth routing information update packet is the seventh router.

DETAILED DESCRIPTION

In embodiments of this application, a router may be a wireless router or a wired router. The router can support the Interior Gateway Protocol such as the OSPF protocol or the IS-IS protocol. Examples are not given one by one herein for illustration.

In the embodiments of this application, a routing information update packet may be a packet that is related to an update of a network topology structure and that needs to be flooded in an entire network. For example, the routing information update packet may be a packet such as any type of LSA packet or any type of LSP packet, for example, a router LSA packet, a purge LSP packet, or a purge LSA packet.

Figure 1:
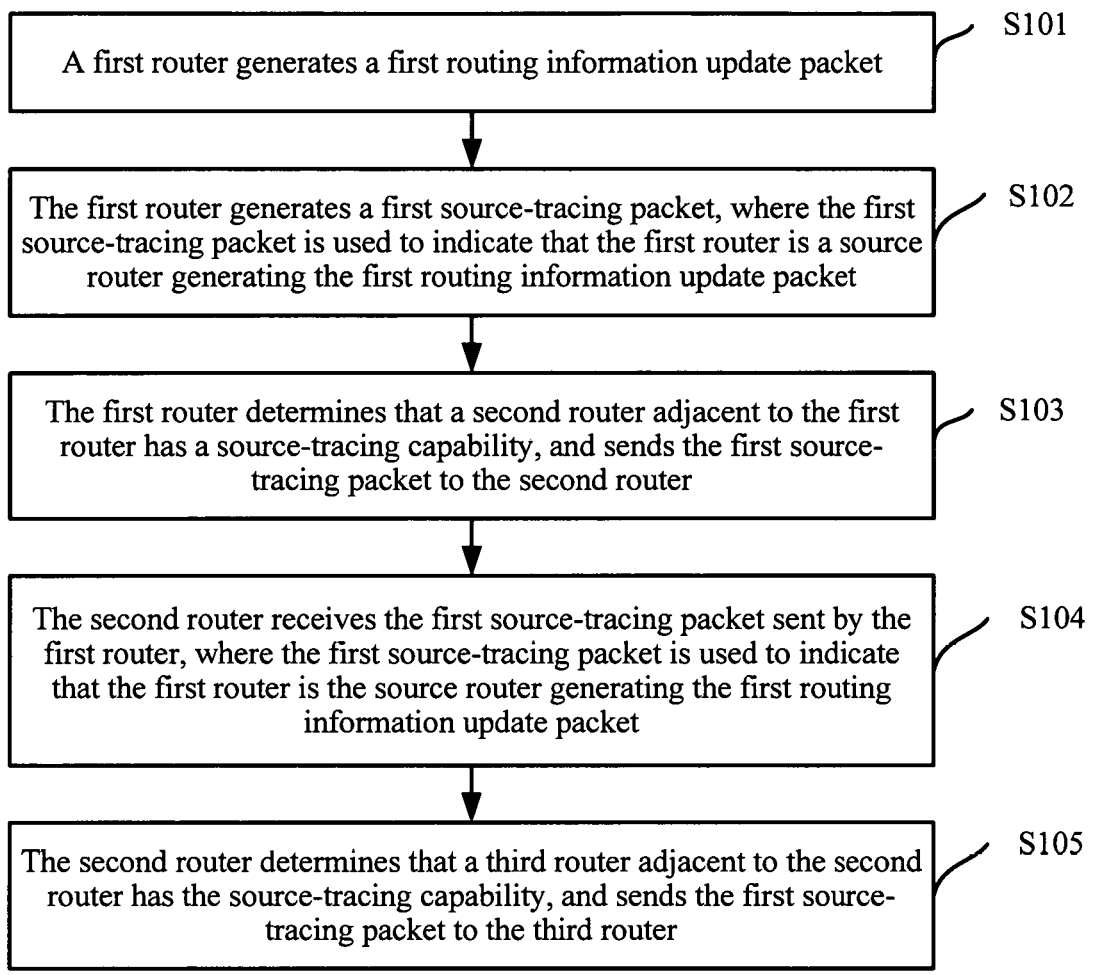
FIG. 1 is a schematic flowchart of a packet transmission method according to an embodiment of this application.

Based on the foregoing description, as shown in FIG. 1, FIG. 1 is a schematic flowchart of a packet transmission method according to an embodiment of this application.

Referring to FIG. 1, the method includes the following steps:

S101. A first router generates a first routing information update packet.

S102. The first router generates a first source-tracing packet, where the first source-tracing packet is used to indicate that the first router is a source router generating the first routing information update packet.

S103. The first router determines that a second router adjacent to the first router has a source-tracing capability, and sends the first source-tracing packet to the second router.

S104. The second router receives the first source-tracing packet sent by the first router, where the first source-tracing packet is used to indicate that the first router is the source router generating the first routing information update packet.

S105. The second router determines that a third router adjacent to the second router has the source-tracing capability, and sends the first source-tracing packet to the third router.

In S101, the first routing information update packet may be an LSA packet, an LSP packet, or the like.

For example, if the first router determines that a router adjacent to the first router is increased by one, in other words, if a network topology changes, the first router generates an LSA packet or an LSP packet. The first router floods the LSA packet or the LSP packet in an entire network in which the first router is located, to notify another router that the router adjacent to the first router is increased by one.

For another example, if the first routing information update packet is the LSP packet, the first router determines that an LSP packet exceeding a lifetime exists in an LSP packet stored by the first router. The first router may set, to 0, a remaining time to live of the LSP packet exceeding the lifetime, and flood, in the entire network in which the first router is located, the LSP packet whose time to live is set to 0, so as to notify another router of the LSP packet whose time to live is set to 0. A router receiving the LSP packet whose time to live is set to 0 may delete, from a stored LSP packet, the LSP packet whose time to live is set to 0.

Alternatively, the first router may generate the first routing information update packet and flood the first routing information update packet in the entire network in another case. Examples are not given one by one herein for illustration.

In S102, the first router may generate the first source-tracing packet after or when the first router generates the first routing information update packet.

The first source-tracing packet can indicate the source router generating the first routing information update packet. The first source-tracing packet may include one or more types of the following information: an identifier (ID) of the source router, a name of the source router, an Internet Protocol (IP) address of the source router, an ID of the first routing information update packet, or a sequence number of the first routing information update packet. The first source-tracing packet may further include other information, and details are not described herein. The source router is a router generating the first routing information update packet. The ID of the source router is used to identify the source router generating the first routing information update packet.

For example, if the first routing information update packet is the LSA packet, the first source-tracing packet generated by the first router may include first information and second information. The first information includes at least one of a router identifier of the first router, a name of the first router, or an IP address of the first router. The second information includes at least one of an ID of the LSA packet or a sequence number of the LSA packet.

For example, if the first routing information update packet is the LSP packet, the first source-tracing packet generated by the first router may include first information and second information. The first information includes at least one of a router identifier of the first router, a name of the first router, or an IP address of the first router. The second information includes at least one of an ID of the LSP packet or a sequence number of the LSP packet.

Optionally, in this embodiment of this application, a protocol used by the first source-tracing packet generated by the first router may be UDP (User Datagram Protocol, User Datagram Protocol). A port for receiving and sending the first source-tracing packet may be a port that is of an existing router and that is disabled for the UDP protocol, for example, a port 1068 or a port 1092. In this embodiment of this application, the first router may set, to be enabled for the UDP protocol, the port for receiving and sending the first source-tracing packet, so that the first source-tracing packet using the UDP protocol can be received. In addition, because a router without the source-tracing capability does not enable the port for receiving and sending the first source-tracing packet, the first source-tracing packet using the UDP protocol cannot be received.

It should be noted that, in this embodiment of this application, a source-tracing packet is a packet that needs to be flooded in the entire network. Specifically, the source-tracing packet may include flooding indication information, and the flooding indication information is used to indicate that a router receiving the source-tracing packet needs to forward the source-tracing packet to a router that is in a router adjacent to the router receiving the source-tracing packet and that has the source-tracing capability.

For example, the first source-tracing packet includes flooding indication information, and the second router has the source-tracing capability. After the second router receives the first source-tracing packet sent by the first router, the second router forwards, based on an indication of the flooding indication information in the first source-tracing packet, the first source-tracing packet to a router that is in a router adjacent to the second router and that has the source-tracing capability.

In S103, after determining that the second router has the source-tracing capability, the first router may send the first routing information update packet to the second router when, before, or after the first router sends the first source-tracing packet to the second router. A sequence for sending the first source-tracing packet and the first routing information update packet is not limited in this embodiment of this application.

If the first router determines that the second router does not have the source-tracing capability, the first router may send the first routing information update packet to the second router, instead of sending the first source-tracing packet.

It should be noted that, in this embodiment of this application, the router adjacent to the first router may be a next-hop router directly connected to the first router, or a next-hop router that is in a routing and forwarding table of the first router and that is of the first router.

It should be noted that, in this embodiment of this application, the source-tracing capability may be a capability of generating or processing a source-tracing packet or a source-tracing assistance packet. To be specific, the source-tracing capability includes one or more of a capability of generating a source-tracing packet, a capability of generating a source-tracing assistance packet, a capability of processing the source-tracing packet, or a capability of processing the source-tracing assistance packet. For example, a router having the source-tracing capability can perform one or more of the following operations: generating a source-tracing packet, receiving a source-tracing packet, parsing a source-tracing packet, sending a source-tracing packet, generating a source-tracing assistance packet, receiving a source-tracing assistance packet, parsing a source-tracing assistance packet, or sending a source-tracing assistance packet.

In this embodiment of this application, the first router may determine, by sending a source-tracing capability negotiation packet to the second router, whether the second router has the source-tracing capability. Specifically, the first router sends a first source-tracing capability negotiation packet to the second router, and after receiving a first source-tracing capability acknowledgement packet returned by the second router based on the first source-tracing capability negotiation packet, the first router determines that the second router has the source-tracing capability. If the first router determines that the first router does not receive the first source-tracing capability acknowledgement packet returned by the second router, the first router determines that the second router does not have the source-tracing capability.

Optionally, after the first router sends the first source-tracing capability negotiation packet to the second router, if the first router determines that the first router does not receive, within preset duration, the first source-tracing capability acknowledgement packet returned by the second router, the first router may re-send the first source-tracing capability negotiation packet. The preset duration may be determined based on an actual situation. For example, the preset duration may be 30 seconds.

Optionally, before the first router re-sends the first source-tracing capability negotiation packet to the second router, the first router may first determine whether a quantity of times of sending the first source-tracing capability negotiation packet to the second router is greater than a threshold of a quantity of retransmission times. If the first router determines that the quantity of times of sending the first source-tracing capability negotiation packet to the second router is less than or equal to the threshold of the quantity of retransmission times, the first router may re-send the first source-tracing capability negotiation packet to the second router. If the first router determines that the quantity of times of sending the first source-tracing capability negotiation packet to the second router is greater than the threshold of the quantity of retransmission times, and determines that the first router does not receive the first source-tracing capability acknowledgement packet returned by the second router, the first router determines that the second router does not have the source-tracing capability. The threshold of the quantity of retransmission times may be determined based on an actual situation. For example, the threshold of the quantity of retransmission times may be 2.

In this embodiment of this application, a source-tracing capability acknowledgement packet may be an ACK (acknowledgement) packet, in other words, the first source-tracing capability acknowledgement packet is a first ACK packet. A router receiving an ACK packet may determine that a router sending the ACK packet has the source-tracing capability.

In this embodiment of this application, a source-tracing capability acknowledgement packet may further include source-tracing capability acknowledgement information, and the source-tracing capability acknowledgement information is used to indicate that a router sending the source-tracing capability acknowledgement packet has the source-tracing capability. For example, source-tracing capability acknowledgement information in the first source-tracing capability acknowledgement packet is used to indicate that the second router has the source-tracing capability.

Optionally, in this embodiment of this application, when sending the first source-tracing capability negotiation packet to the second router, the first router may further indicate, to the second router by using the first source-tracing capability negotiation packet, that the first router has the source-tracing capability. For example, the first source-tracing capability negotiation packet may include source-tracing capability indication information. The source-tracing capability indication information in the first source-tracing capability negotiation packet is used to indicate that the first router has the source-tracing capability. After receiving the first source-tracing capability negotiation packet, the second router may determine, based on the source-tracing capability indication information in the first source-tracing capability negotiation packet, that the first router has the source-tracing capability.

Optionally, in this embodiment of this application, a protocol used by a source-tracing capability negotiation packet and a source-tracing capability acknowledgement packet may be UDP. A port for receiving and sending the source-tracing capability negotiation packet or the source-tracing capability acknowledgement packet may be a port that is of an existing router and that is disabled for the UDP protocol, for example, a port 1068 or a port 1092. In this embodiment of this application, a router having the source-tracing capability may set, to be enabled for the UDP protocol, the port for receiving and sending the source-tracing capability negotiation packet or the source-tracing capability acknowledgement packet, so that the source-tracing capability negotiation packet or the source-tracing capability acknowledgement packet using the UDP protocol can be received. In addition, because a router without the source-tracing capability does not enable the port for receiving and sending the source-tracing capability negotiation packet or the source-tracing capability acknowledgement packet, the source-tracing capability negotiation packet or the source-tracing capability acknowledgement packet using the UDP protocol cannot be received.

For example, the first router sends, to the second router by using a port disabled for the UDP protocol, the first source-tracing capability negotiation packet using the UDP protocol. If the second router does not have the source-tracing capability, the second router cannot receive the first source-tracing capability negotiation packet, and therefore the second router cannot return the first source-tracing capability acknowledgement packet to the first router.

Optionally, in this embodiment of this application, a router having the source-tracing capability may further send a source-tracing capability disabling packet to a router adjacent to the router having the source-tracing capability. The source-tracing capability disabling packet is used to indicate that the router sending the source-tracing capability disabling packet temporarily stops supporting the source-tracing capability.

With reference to the foregoing description, in this embodiment of this application, the first router may receive a first source-tracing capability disabling packet sent by the second router, and the first source-tracing capability disabling packet is used to indicate that the second router temporarily stops supporting the source-tracing capability. In this case, the first router determines that the second router temporarily stops supporting the source-tracing capability, and therefore the first router determines that the second router is a router that does not have the source-tracing capability. Correspondingly, the first router may send a second source-tracing capability disabling packet to the second router, and the second source-tracing capability disabling packet is used to indicate that the first router temporarily stops supporting the source-tracing capability. After receiving the second source-tracing capability disabling packet, the second router determines that the first router temporarily stops supporting the source-tracing capability, and therefore the second router determines that the first router is a router that does not have the source-tracing capability.

In the foregoing method, when a router having the source-tracing capability runs at high load, the router may temporarily stop supporting the source-tracing capability, thereby relieving load of the router.

In this embodiment of this application, after generating the first source-tracing packet, the first router may determine whether duration between a moment of sending a third source-tracing capability negotiation packet to the second router in a previous period and a moment of generating the first source-tracing packet exceeds preset duration, and send the first source-tracing capability negotiation packet to the second router if the duration exceeds the preset duration. The third source-tracing capability negotiation packet is used to query whether the second router has the source-tracing capability. The preset duration may be duration corresponding to one period, and the period may be determined based on an actual situation. For example, the period may be 3600 seconds.

If the first router determines that the duration between the moment of sending the third source-tracing capability negotiation packet to the second router in the previous period and the moment of generating the first source-tracing packet does not exceed the preset duration, the first router may determine, based on a source-tracing capability status that is determined in the previous period and that is of the second router, whether the second router has the source-tracing capability. Specifically, if the first router determines, in the previous period by sending the third source-tracing capability negotiation packet, that the second router has the source-tracing capability, the first router determines that the second router has the source-tracing capability. If the first router determines, in the previous period by sending the third source-tracing capability negotiation packet, that the second router does not have the source-tracing capability, the first router determines that the second router does not have the source-tracing capability.

Optionally, after the first router sends the first source-tracing packet to the second router, if the first router determines that the duration between the moment of sending the third source-tracing capability negotiation packet to the second router in the previous period and the moment of generating the first source-tracing packet exceeds the preset duration, the first router sends a fourth source-tracing capability negotiation packet to the second router. Both the third source-tracing capability negotiation packet and the fourth source-tracing capability negotiation packet are used to query whether the second router has the source-tracing capability.

In the foregoing method, the first router can update a source-tracing capability of the second router in real time, so as to accurately determine whether the second router has the source-tracing capability.

Correspondingly, the first router may further receive a second source-tracing capability negotiation packet sent by a third router, and the second source-tracing capability negotiation packet is used to query whether the first router has the source-tracing capability. The first router may send a second source-tracing capability acknowledgement packet to the third router, and the second source-tracing capability acknowledgement packet is used to indicate that the first router has the source-tracing capability. Certainly, if the first router does not have the source-tracing capability, the first router does not send the second source-tracing capability acknowledgement packet to the third router. If the third router does not receive the second source-tracing capability acknowledgement packet, the third router determines that the first router does not have the source-tracing capability. The third router is a router adjacent to the first router. The third router may be a router the same as the second router or a router different from the second router.

In this embodiment of this application, after the first router sends the second source-tracing capability acknowledgement packet to the third router, the first router may further receive a second routing information update packet and a second source-tracing packet that are sent by the third router, and the second source-tracing packet is used to indicate a source router generating the second routing information update packet. The first router may determine, based on the second source-tracing packet, the source router generating the second routing information update packet. Optionally, after receiving the second routing information update packet, the first router may update routing information based on the second routing information update packet. The first router may further determine, based on the second source-tracing packet, the source router generating the second routing information update packet. The second source-tracing packet is sent by the third router after the third router determines that the first router has the source-tracing capability.

Correspondingly, the first router may further forward the received second source-tracing packet to a router that is in a router adjacent to the first router and that has the source-tracing capability.

Optionally, in this embodiment of this application, after receiving a routing information update packet sent by a router adjacent to the first router, the first router may further generate a source-tracing assistance packet indicating a source router generating the routing information update packet. The following provides detailed descriptions of different scenarios.

In a possible scenario, the first router receives a third routing information update packet sent by a fourth router. After the first router receives the third routing information update packet, if the first router determines that a fifth router adjacent to the first router has the source-tracing capability, the first router generates a first source-tracing assistance packet, and sends the first source-tracing assistance packet to the fifth router. The first source-tracing assistance packet is used to indicate that the fourth router is a source router generating the third routing information update packet. The fourth router may be a router the same as the third router or a router different from the third router. The fifth router may be a router the same as the second router or a router different from the second router.

Optionally, after the first router receives the third routing information update packet sent by the fourth router, if the first router determines that none of routers adjacent to the first router have the source-tracing capability, the first router may not generate the first source-tracing assistance packet, but forward the third routing information update packet to the routers adjacent to the first router.

In this method, before the first router receives a source-tracing packet from the fourth router, the first router may generate the first source-tracing assistance packet. This helps another router quickly locate a router for which whether the router has the source-tracing capability is not determined.

In another possible scenario, the first router may receive the third routing information update packet sent by the fourth router. After the first router receives the third routing information update packet, if the first router determines that the fourth router does not have the source-tracing capability and the fifth router adjacent to the first router has the source-tracing capability, the first router may generate the first source-tracing assistance packet. After generating the first source-tracing assistance packet, the first router sends the first source-tracing assistance packet to the fifth router. The first source-tracing assistance packet is used to indicate that the fourth router is a source router generating the third routing information update packet.

Optionally, after the first router receives the third routing information update packet sent by the fourth router, if the first router determines that the fourth router does not have the source-tracing capability and none of routers adjacent to the first router have the source-tracing capability, the first router may not generate the first source-tracing assistance packet, but forward the third routing information update packet to the router adjacent to the first router.

In the foregoing method, after the fourth router that does not have the source-tracing capability generates a routing information update packet, a router that is adjacent to the fourth router and that has the source-tracing capability, for example, the first router, may generate a source-tracing assistance packet such as the first source-tracing assistance packet. This helps another router quickly locate a router that does not have the source-tracing capability, and a router having the source-tracing capability and the router that does not have the source-tracing capability can be compatible with each other.

It should be noted that, a method for determining, by the first router, whether routers such as the fourth router and the fifth router have the source-tracing capability is the same as the method for determining, by the first router, whether the second router has the source-tracing capability, and details are not described herein again.

Optionally, after the first router generates the first source-tracing assistance packet, before the first router sends the first source-tracing assistance packet to the fifth router, the first router determines whether duration between a moment of sending a fifth source-tracing capability negotiation packet to the fifth router in a previous period and a moment of generating the first source-tracing assistance packet exceeds preset duration, and sends a sixth source-tracing capability negotiation packet to the fifth router if the duration exceeds the preset duration. Both the fifth source-tracing capability negotiation packet and the sixth source-tracing capability negotiation packet are used to query whether the fifth router has the source-tracing capability.

If the first router determines that the duration between the moment of sending the fifth source-tracing capability negotiation packet to the fifth router in the previous period and the moment of generating the first source-tracing assistance packet does not exceed the preset duration, the first router may determine, based on a source-tracing capability status that is determined in the previous period and that is of the fifth router, whether the fifth router has the source-tracing capability. Specifically, if the first router determines, in the previous period by sending the fifth source-tracing capability negotiation packet, that the fifth router has the source-tracing capability, the first router determines that the fifth router has the source-tracing capability. If the first router determines, in the previous period by sending the fifth source-tracing capability negotiation packet, that the fifth router does not have the source-tracing capability, the first router determines that the fifth router does not have the source-tracing capability.

Optionally, after the first router sends the first source-tracing assistance packet to the fifth router, if the first router determines that the duration between the moment of sending the fifth source-tracing capability negotiation packet to the fifth router in the previous period and the moment of generating the first source-tracing assistance packet exceeds the preset duration, the first router sends a seventh source-tracing capability negotiation packet to the fifth router. The seventh source-tracing capability negotiation packet is used to query whether the fifth router has the source-tracing capability.

It should be noted that, in this embodiment of this application, after the first router receives a routing information update packet, a generated source-tracing assistance packet may include one or more types of the following information:

a router identifier of a router sending the routing information update packet to the first router, a name of the router sending the routing information update packet to the first router, an IP address of the router sending the routing information update packet to the first router, an IP address of a router generating the source-tracing assistance packet, a router identifier of the router generating the source-tracing assistance packet, a router name of the router generating the source-tracing assistance packet, an ID of the routing information update packet, or a sequence number of the routing information update packet.

For example, after receiving the third routing information update packet sent by the fourth router, the first router determines that the fourth router does not have the source-tracing capability and the fifth router adjacent to the first router has the source-tracing capability. In this case, the first source-tracing assistance packet generated by the first router includes one or more types of the following information: a router identifier of the first router, a name of the first router, an IP address of the first router, a router identifier of the fourth router, a name of the fourth router, an IP address of the fourth router, an ID of the third routing information update packet, or a sequence number of the third routing information update packet.

Certainly, a source-tracing assistance packet may further include other information, and details are not described herein.

It should be noted that, in this embodiment of this application, a source-tracing assistance packet is a packet that needs to be flooded in the entire network. The source-tracing assistance packet may include flooding indication information, and the flooding indication information is used to instruct a router receiving the source-tracing assistance packet to forward the source-tracing assistance packet to a router that is in a router adjacent to the router receiving the source-tracing assistance packet and that has the source-tracing capability.

Correspondingly, a source-tracing assistance packet may be a UDP packet, and a port for receiving and sending the source-tracing assistance packet is a port that is of an existing router and that is disabled for the UDP protocol, for example, a port 1068 or a port 1092. In this embodiment of this application, a router having the source-tracing capability sets, to be enabled for the UDP protocol, the port for receiving and sending the source-tracing assistance packet, and therefore a router that does not have the source-tracing capability cannot receive the source-tracing assistance packet or the like.

For example, the second router has the source-tracing capability. After receiving the first source-tracing assistance packet sent by the first router, the second router forwards the first source-tracing assistance packet to a router that is in a router adjacent to the second router and that has the source-tracing capability.

In the foregoing solution, after the first router receives the third routing information update packet sent by the fourth router adjacent to the first router, if the first router determines that the fourth router sending the third routing information update packet does not have the source-tracing capability, the first router may generate a first source-tracing assistance packet corresponding to the third routing information update packet. The first source-tracing assistance packet indicates that the fourth router is a source router generating the third routing information update packet. Instead of the fourth router that does not have the source-tracing capability, the first router can generate the first source-tracing assistance packet corresponding to the third routing information update packet, so that the fourth router that does not have the source-tracing capability is quickly located by another router when the fourth router sends the third routing information update packet. This facilitates mutual compatibility between a router having the source-tracing capability and a router that does not have the source-tracing capability.

In this embodiment of this application, to accurately determine a source router generating a routing information update packet, the router may be preferentially subject to a source router indicated by a source-tracing packet.

Specifically, the first router obtains a second source-tracing assistance packet and a third source-tracing packet. The second source-tracing assistance packet is used to indicate that a sixth router is a source router generating a fourth routing information update packet, and the third source-tracing packet is used to indicate that a seventh router is the source router generating the fourth routing information update packet. The first router determines, based on the third source-tracing packet, that the source router generating the fourth routing information update packet is the seventh router.

For example, a router A receives a routing information update packet L1 and a source-tracing assistance packet M1 that are sent by a router B, and the source-tracing assistance packet M1 is used to indicate that a router C is a source router generating the routing information update packet L1. In addition, the router A further receives the routing information update packet L1 and a source-tracing packet M2 that are sent by a router D, and the source-tracing packet M2 is used to indicate that the router D is the source router generating the routing information update packet L1. In this case, the router A may determine, based on the source-tracing packet M2, that the router D is the source router generating the routing information update packet L1, so that the accurate source router is determined.

In the foregoing solution, when the first router receives a source-tracing packet and a source-tracing assistance packet that are corresponding to a same routing information update packet, the first router preferentially determines, based on the source-tracing packet, a source router generating the routing information update packet. In this solution, when the source-tracing packet and the source-tracing assistance packet indicate different source routers generating the same routing information update packet, a router receiving the routing information update packet can accurately determine the source router generating the routing information update packet, so that a router having the source-tracing capability and a router that does not have the source-tracing capability coexist.

In S104, the second router may further determine, based on the first source-tracing packet, that the first router is the source router generating the first routing information update packet. Optionally, the second router may further receive the first routing information update packet sent by the first router, so as to update routing information based on the first routing information update packet.

In S105, after determining that the third router has the source-tracing capability, the second router may further forward the received first routing information update packet to the third router.

Optionally, after determining that the third router does not have the source-tracing capability, the second router may send the first routing information update packet to the third router.

The second router may further receive the first source-tracing capability negotiation packet sent by the first router, and return the first source-tracing capability acknowledgement packet to the first router. In this way, the first router can determine, based on the first source-tracing capability acknowledgement packet, that the second router has the source-tracing capability.

Certainly, the second router may send a source-tracing capability negotiation packet to the first router, to learn whether the first router has the source-tracing capability.

For another function of the second router, refer to descriptions in S101 to S103. Details are not described herein again.

The foregoing method procedure is described below by using specific embodiments.

Figure 2:
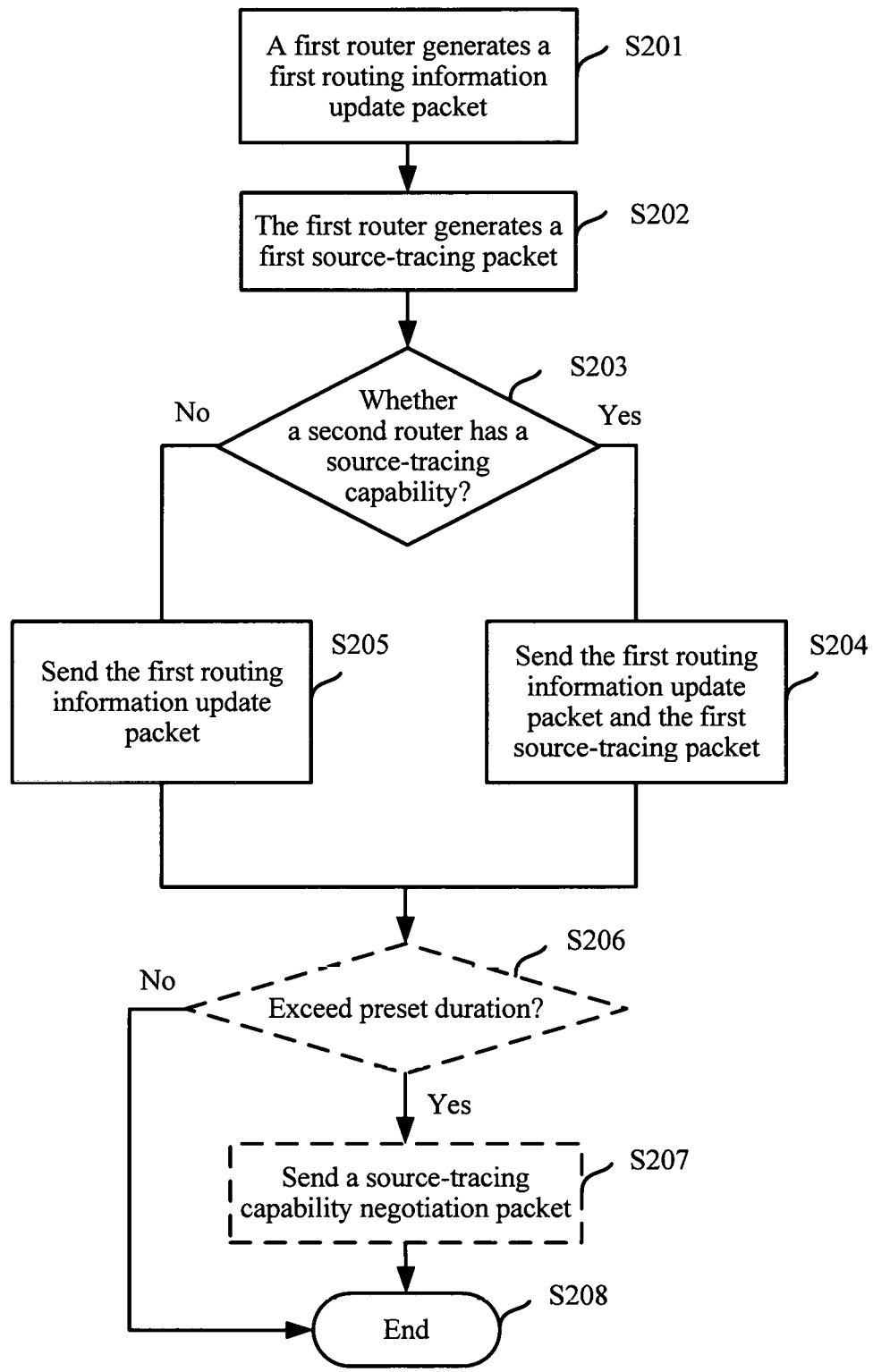
FIG. 2 is a schematic flowchart of a packet transmission method according to an embodiment of this application.

As shown in FIG. 2, FIG. 2 is a schematic flowchart of a packet transmission method according to an embodiment of this application.

S201. A first router generates a first routing information update packet.

S202. The first router generates a first source-tracing packet.

S203. The first router determines whether a second router adjacent to the first router has a source-tracing capability, and performs S204 if the second router has the source-tracing capability, or performs S205 if the second router does not have the source-tracing capability.

After generating the first source-tracing packet, the first router may determine, by sending a source-tracing capability negotiation packet to the second router, whether the second router has the source-tracing capability.

S204. The first router sends the first routing information update packet and the first source-tracing packet to the second router.

S205. The first router sends the first routing information update packet to the second router.

Optionally, after S204 or S205, the method provided in this embodiment of this application may further include S206: The first router determines whether duration between a moment of sending a source-tracing capability negotiation packet to the second router in a previous period and a moment of generating the first source-tracing packet exceeds preset duration, and performs S207 if the duration exceeds the preset duration, or performs S208 if the duration does not exceed the preset duration.

S207. The first router sends the source-tracing capability negotiation packet to the second router, to update a source-tracing capability of the second router.

S208. End this procedure.

Figure 3:
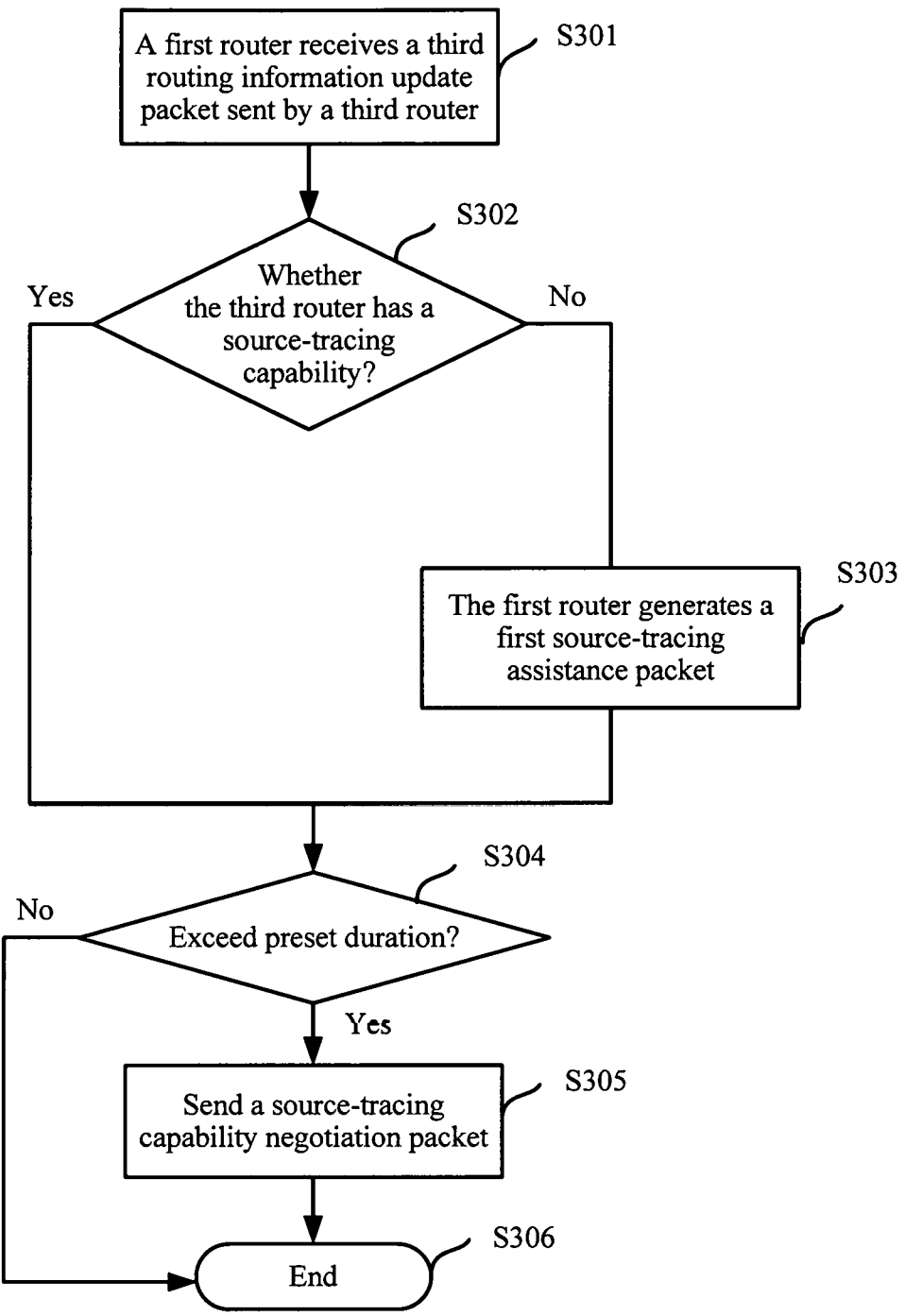
FIG. 3 is a schematic flowchart of a packet transmission method according to an embodiment of this application.

As shown in FIG. 3, FIG. 3 is a schematic flowchart of a packet transmission method according to an embodiment of this application.

S301. A first router receives a third routing information update packet sent by a third router.

S302. The first router determines whether the third router has a source-tracing capability, and performs S303 if the third router does not have the source-tracing capability, or performs S304 if the third router has the source-tracing capability.

After receiving the third routing information update packet, the first router may determine, by sending a source-tracing capability negotiation packet to the third router, whether the third router has the source-tracing capability.

S303. The first router generates a first source-tracing assistance packet, and then performs S304.

The first source-tracing assistance packet is used to indicate that the third router is a source router generating the third routing information update packet.

S304. The first router determines whether duration between a moment of sending a source-tracing capability negotiation packet to the third router in a previous period and a moment of receiving the third routing information update packet exceeds preset duration, and performs S305 if the duration exceeds the preset duration, or performs S306 if the duration does not exceed the preset duration.

S305. The first router sends the source-tracing capability negotiation packet to the third router, to update a source-tracing capability of the third router.

S306. End this procedure.

Figure 4:
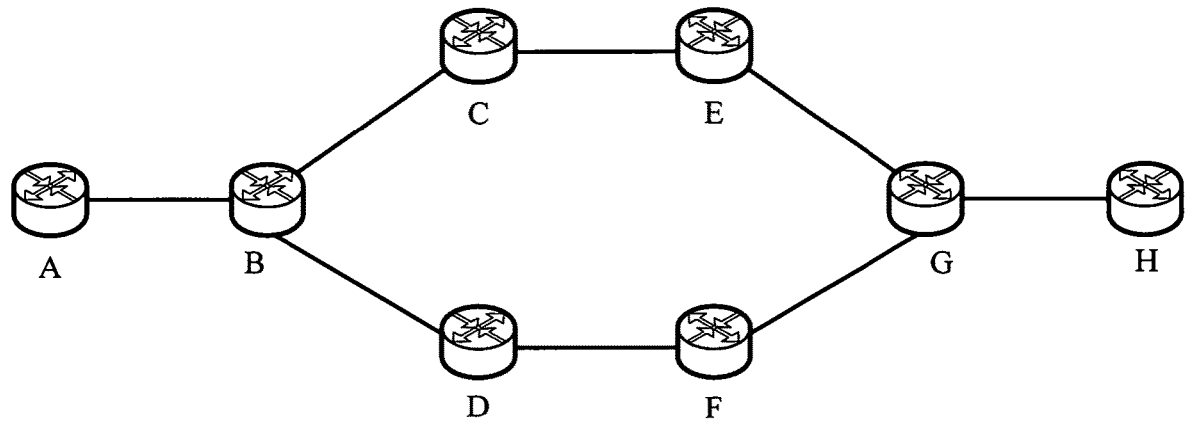
FIG. 4 is a schematic diagram of a router connection according to an embodiment of this application.

As shown in FIG. 4, FIG. 4 is a schematic diagram of a router connection according to an embodiment of this application.

Eight routers: Router A thru router H are included in FIG. 4. The router A is adjacent to the router B. The router B is adjacent to all of the router A, the router C, and the router D. The router C is adjacent to both the router B and the router E. The router D is adjacent to both the router B and the router F. The router E is adjacent to both the router C and the router G The router F is adjacent to both the router D and the router G The router G is adjacent to all of the router E, the router F, and the router H. The router H is adjacent to the router G.

The following provides separate descriptions of different scenarios.

In a first scenario, any router in FIG. 4 has a source-tracing capability, in other words, all of the router A to the router H have the source-tracing capability. When or after any router generates a routing information update packet, the router generates a source-tracing packet corresponding to the routing information update packet. Another router in the scenario shown in FIG. 4 can determine, based on the source-tracing packet, a source router generating the routing information update packet.

In a second scenario, only the router C in the scenario shown in FIG. 4 does not have a source-tracing capability, and all of the other routers in the scenario shown in FIG. 4 have the source-tracing capability. After generating a routing information update packet and a source-tracing packet corresponding to the routing information update packet, the router A sends the routing information update packet and the source-tracing packet to the router B. The source-tracing packet indicates that the router A is a source router generating the routing information update packet. Because the router C does not have the source-tracing capability, the router B sends only the routing information update packet to the router C. Because the router D has the source-tracing capability, the router B sends the routing information update packet and the source-tracing packet to the router D.

After receiving the routing information update packet, the router C sends the routing information update packet to the router E. The router E determines that the router C does not have the source-tracing capability, and after receiving the routing information update packet from the router C, the router E generates a source-tracing assistance packet. The source-tracing assistance packet indicates that the router C is the source router generating the routing information update packet. The router E sends the source-tracing capability assistance packet to the router G.

After receiving the routing information update packet and the source-tracing packet, the router D sends the routing information update packet and the source-tracing packet to the router F. Then, the router F sends the routing information update packet and the source-tracing packet to the router G.

The router G receives the routing information update packet and the source-tracing assistance packet that are sent by the router E. The router G may further receive the routing information update packet and the source-tracing packet from the router F. In this case, the router G preferentially determines, based on the source-tracing packet, that the source router generating the routing information update packet is the router A.

In a third scenario, neither the router C nor the router D in the scenario shown in FIG. 4 has a source-tracing capability, and all of the other routers in the scenario shown in FIG. 4 have the source-tracing capability. After generating a routing information update packet and a source-tracing packet corresponding to the routing information update packet, the router A sends the routing information update packet and the source-tracing packet to the router B. The source-tracing packet indicates that the router A is a source router generating the routing information update packet. Because neither the router C nor the router D has the source-tracing capability, the router B sends only the routing information update packet to the router C and the router D. The router C forwards, to the router E, the routing information update packet generated by the router A. The router E determines that the router C does not have the source-tracing capability, and after receiving the routing information update packet sent by the router C, the router E generates a first source-tracing assistance packet corresponding to the routing information update packet. The first source-tracing assistance packet indicates that the router C is the source router generating the routing information update packet. The router D forwards, to the router F, the routing information update packet generated by the router A. The router F determines that the router D does not have the source-tracing capability, and after receiving the routing information update packet sent by the router D, the router F generates a second source-tracing assistance packet corresponding to the routing information update packet. The second source-tracing assistance packet indicates that the router D is the source router generating the routing information update packet. The router G receives the routing information update packet and the first source-tracing assistance packet that are sent by the router E. The router G may further receive the routing information update packet and the second source-tracing assistance packet that are sent by the router F. The router G determines, based on the first source-tracing assistance packet, that the source router corresponding to the routing information update packet is the router C. The router G determines, based on the second source-tracing assistance packet, that the source router corresponding to the routing information update packet is the router D. Then, the router G may determine, based on the router C or the router D, that the source router sending the routing information update packet is the router B. The router G may further determine, based on the second source-tracing packet received by the router B, that the source router sending the routing information update packet is the router A.

Based on a same technical concept, an embodiment of this application further provides a packet transmission apparatus, and the packet transmission apparatus may perform the foregoing method embodiment.

Figure 5:
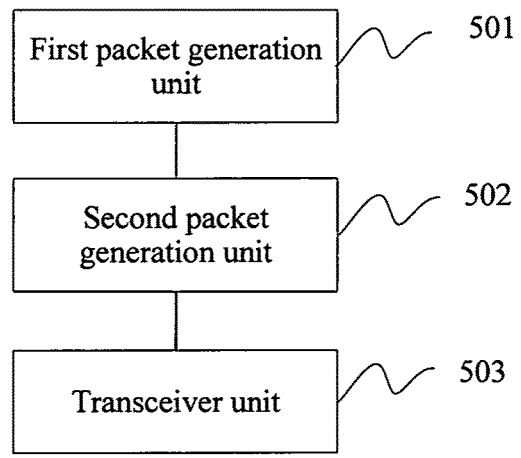
FIG. 5 is a schematic structural diagram of a packet transmission apparatus according to an embodiment of this application.

As shown in FIG. 5, FIG. 5 is a schematic structural diagram of a packet transmission apparatus according to an embodiment of this application. The apparatus is disposed in a first router, and the apparatus includes:

a first packet generation unit 501, configured to generate a first routing information update packet;

a second packet generation unit 502, configured to generate a first source-tracing packet, where the first source-tracing packet is used to indicate that the first router is a source router generating the first routing information update packet; and a transceiver unit 503, configured to: determine that a second router adjacent to the apparatus has a source-tracing capability, and send the first source-tracing packet to the second router.

Optionally, the transceiver unit 503 is further configured to:

determine that the second router does not have the source-tracing capability, and send the first routing information update packet to the second router.

Optionally, the transceiver unit 503 is specifically configured to:

send a first source-tracing capability negotiation packet to the second router, where the first source-tracing capability negotiation packet is used to query whether the second router has the source-tracing capability; and after receiving a first source-tracing capability acknowledgement packet sent by the second router, determine that the second router has the source-tracing capability, where the first source-tracing capability acknowledgement packet is used to indicate that the second router has the source-tracing capability.

Optionally, the transceiver unit 503 is further configured to:

send the first source-tracing capability negotiation packet to the second router if the duration between a moment of sending a third source-tracing capability negotiation packet to the second router in a previous period and a moment of generating the first source-tracing packet exceeds preset duration, where the preset duration is duration corresponding to one period, and the third source-tracing capability negotiation packet is used to query whether the second router has the source-tracing capability.

Optionally, the transceiver unit 503 is further configured to:

send a fourth source-tracing capability negotiation packet to the second router if the duration between the moment of sending the third source-tracing capability negotiation packet to the second router in the previous period and the moment of generating the first source-tracing packet exceeds the preset duration, where both the third source-tracing capability negotiation packet and the fourth source-tracing capability negotiation packet are used to query whether the second router has the source-tracing capability.

Optionally, the transceiver unit 503 is further configured to:

receive a second source-tracing capability negotiation packet sent by a third router, where the second source-tracing capability negotiation packet is used to query whether the first router has the source-tracing capability; and send a second source-tracing capability acknowledgement packet to the third router, where the second source-tracing capability acknowledgement packet is used to indicate that the first router has the source-tracing capability.

Optionally, the transceiver unit 503 is further configured to:

receive a second routing information update packet and a second source-tracing packet that are sent by the third router, where the second source-tracing packet is used to indicate a source router generating the second routing information update packet; and determine, based on the second source-tracing packet, the source router generating the second routing information update packet.

Optionally, the transceiver unit 503 is configured to receive a third routing information update packet sent by a fourth router.

The second packet generation unit 502 is configured to: determine that the fourth router does not have the source-tracing capability and a fifth router adjacent to the apparatus has the source-tracing capability, and generate a first source-tracing assistance packet, where the first source-tracing assistance packet is used to indicate that the fourth router is a source router generating the third routing information update packet.

The transceiver unit 503 is configured to send the first source-tracing assistance packet to the fifth router.

Optionally, the transceiver unit 503 is further configured to:

obtain a second source-tracing assistance packet and a third source-tracing packet, where the second source-tracing assistance packet is used to indicate that a sixth router is a source router generating a fourth routing information update packet, and the third source-tracing packet is used to indicate that a seventh router is the source router generating the fourth routing information update packet; and determine, based on the third source-tracing packet, that the source router generating the fourth routing information update packet is the seventh router.

Based on a same technical concept, an embodiment of this application further provides a packet transmission apparatus, and the packet transmission apparatus may perform the foregoing method embodiment.

Figure 6:
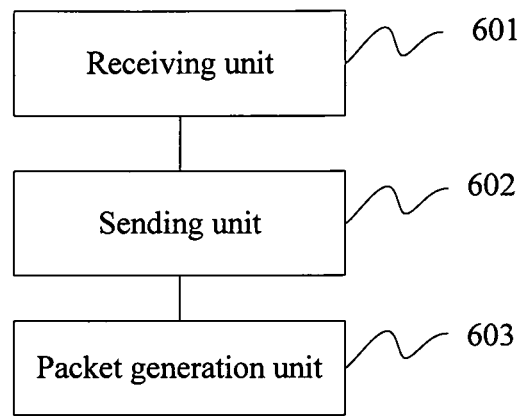
FIG. 6 is a schematic structural diagram of a packet transmission apparatus according to an embodiment of this application.

As shown in FIG. 6, FIG. 6 is a schematic structural diagram of a packet transmission apparatus according to an embodiment of this application. The apparatus includes:

a receiving unit 601, configured to receive a first source-tracing packet sent by a first router, where the first source-tracing packet is used to indicate that the first router is a source router generating a first routing information update packet; and a sending unit 602, configured to: determine that a third router adjacent to the apparatus has a source-tracing capability, and send the first source-tracing packet to the third router.

Optionally, the sending unit 602 is further configured to:

determine that the third router does not have the source-tracing capability, and send the first routing information update packet to the third router.

Optionally, the apparatus further includes a packet generation unit 603.

The receiving unit 601 is configured to receive a second routing information update packet sent by a fourth router.

The packet generation unit 603 is configured to: determine that the fourth router does not have the source-tracing capability and a fifth router adjacent to the apparatus has the source-tracing capability, and generate a first source-tracing assistance packet, where the first source-tracing assistance packet is used to indicate that the fourth router is a source router generating the second routing information update packet.

The sending unit 602 is configured to send the first source-tracing assistance packet to the fifth router.

Optionally, the apparatus further includes a packet generation unit 603.

The receiving unit 601 is configured to receive a second routing information update packet sent by a fourth router.

The packet generation unit 603 is configured to: determine that a fifth router adjacent to the apparatus has the source-tracing capability, and generate a first source-tracing assistance packet, where the first source-tracing assistance packet is used to indicate that the fourth router is a source router generating the second routing information update packet.

The sending unit 602 is configured to send the first source-tracing assistance packet to the fifth router.

Optionally, the receiving unit 601 is further configured to:
receive a second source-tracing assistance packet and a second source-tracing packet, where the second source-tracing assistance packet is used to indicate that a sixth router is a source router generating a fourth routing information update packet, and the second source-tracing packet is used to indicate that a seventh router is the source router generating the fourth routing information update packet; and
determine, based on the second source-tracing packet, that the source router generating the fourth routing information update packet is the seventh router.

Based on a same technical concept, an embodiment of this application further provides a packet transmission apparatus, and the packet transmission apparatus may perform the foregoing method embodiment.

Figure 7:
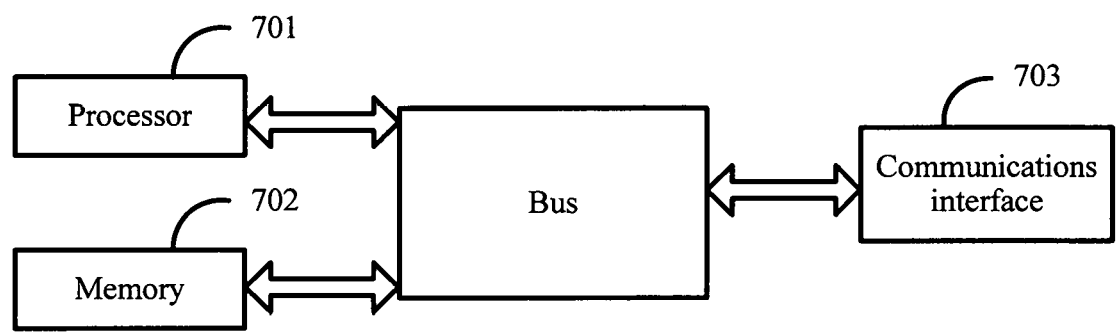
FIG. 7 is a schematic structural diagram of a packet transmission apparatus according to an embodiment of this application.

As shown in FIG. 7, FIG. 7 is a schematic structural diagram of a packet transmission apparatus according to an embodiment of this application.

The apparatus includes a processor 701, a memory 702, and a communications interface 703.

The communications interface 703 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be, for example, a wireless local area network communications interface, a cellular network communications interface, or a combination thereof. The processor 701 may be a central processing unit (CPU), a network processor (NP), or a combination of the CPU and the NP. The processor 701 may further include a hardware chip. The hardware chip may be an application-specific integrated circuit (ASIC), a programmable logic device (PLD), or a combination thereof. The PLD may be a complex programmable logic device (CPLD), a field programmable logic gate array (FPGA), generic array logic (GAL), or any combination thereof. The memory 702 may include a volatile memory such as a random access memory (RAM), or the memory 702 may include a non-volatile memory such as a read-only memory (ROM), a flash memory, a hard disk drive (HDD), or a solid state drive (SSD). Alternatively, the memory 702 may include a combination of the foregoing types of memories.

The memory 702 may be configured to store a program. Optionally, the memory 702 may further store a received packet.

The processor 701 reads an instruction corresponding to the program from the memory 702, to perform the following operations:

generating a first routing information update packet;

generating a first source-tracing packet, where the first source-tracing packet is used to indicate that the first router is a source router generating the first routing information update packet;

determining that a second router adjacent to the apparatus has a source-tracing capability; and sending the first source-tracing packet to the second router by using the communications interface 703.

Optionally, the processor 701 further determines that the second router does not have the source-tracing capability, and sends the first routing information update packet to the second router by using the communications interface 703.

Optionally, the processor 701 is specifically configured to:
send a first source-tracing capability negotiation packet to the second router by using the communications interface 703, where the first source-tracing capability negotiation packet is used to query whether the second router has the source-tracing capability; and
after receiving, by using the communications interface 703, a first source-tracing capability acknowledgement packet sent by the second router, determine that the second router has the source-tracing capability, where the first source-tracing capability acknowledgement packet is used to indicate that the second router has the source-tracing capability.

Optionally, the processor 701 is further configured to send the first source-tracing capability negotiation packet to the second router by using the communications interface 703 if the duration between a moment of sending a third source-tracing capability negotiation packet to the second router in a previous period and a moment of generating the first source-tracing packet exceeds preset duration, where the preset duration is duration corresponding to one period, and the third source-tracing capability negotiation packet is used to query whether the second router has the source-tracing capability.

Optionally, the processor 701 is further configured to send a fourth source-tracing capability negotiation packet to the second router by using the communications interface 703 if the duration between the moment of sending the third source-tracing capability negotiation packet to the second router in the previous period and the moment of generating the first source-tracing packet exceeds the preset duration, where both the third source-tracing capability negotiation packet and the fourth source-tracing capability negotiation packet are used to query whether the second router has the source-tracing capability.

Optionally, the processor 701 is further configured to:
receive, by using the communications interface 703, a second source-tracing capability negotiation packet sent by a third router, where the second source-tracing capability negotiation packet is used to query whether the first router has the source-tracing capability; and
send a second source-tracing capability acknowledgement packet to the third router by using the communications interface 703, where the second source-tracing capability acknowledgement packet is used to indicate that the first router has the source-tracing capability.

Optionally, the processor 701 is further configured to:
receive, by using the communications interface 703, a second routing information update packet and a second source-tracing packet that are sent by the third router, where the second source-tracing packet is used to indicate a source router generating the second routing information update packet; and determine, based on the second source-tracing packet, the source router generating the second routing information update packet.

Optionally, the processor 701 is further configured to:

receive, by using the communications interface 703, a third routing information update packet sent by a fourth router;

determine that the fourth router does not have the source-tracing capability and a fifth router adjacent to the apparatus has the source-tracing capability, and generate a first source-tracing assistance packet, where the first source-tracing assistance packet is used to indicate that the fourth router is a source router generating the third routing information update packet; and send the first source-tracing assistance packet to the fifth router by using the communications interface 703.

Optionally, the processor 701 is further configured to:

obtain a second source-tracing assistance packet and a third source-tracing packet, where the second source-tracing assistance packet is used to indicate that a sixth router is a source router generating a fourth routing information update packet, and the third source-tracing packet is used to indicate that a seventh router is the source router generating the fourth routing information update packet; and determine, based on the third source-tracing packet, that the source router generating the fourth routing information update packet is the seventh router.

A bus may further be included in FIG. 7, and the bus may include any quantity of interconnected buses and bridges, and specifically link various circuits of one or more processors represented by the processor and a memory represented by the memory. The bus may further link various other circuits such as a peripheral device, a voltage stabilizer, and a power management circuit. The circuits are no longer further described in this specification. The communications interface provides a unit for communicating with various other devices on a transmission medium. The processor is responsible for bus architecture management and general processing. The memory may store data used when the processor performs an operation.

Based on a same technical concept, an embodiment of this application further provides a packet transmission apparatus, and the packet transmission apparatus may perform the foregoing method embodiment.

Figure 8:
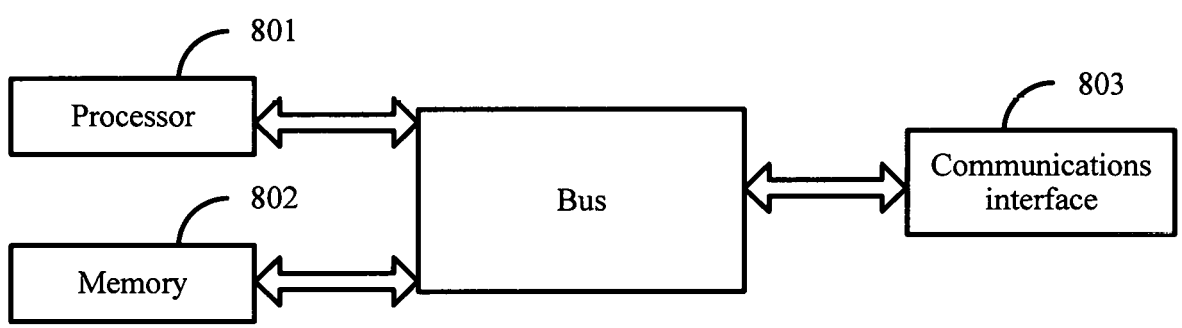
FIG. 8 is a schematic structural diagram of a packet transmission apparatus according to an embodiment of this application.

As shown in FIG. 8, FIG. 8 is a schematic structural diagram of a packet transmission apparatus according to an embodiment of this application.

The apparatus includes a processor 801, a memory 802, and a communications interface 803.

The communications interface 803 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be, for example, a wireless local area network communications interface, a cellular network communications interface, or a combination thereof. The processor 801 may be a CPU, an NP, or a combination of the CPU and the NP. The processor 801 may further include a hardware chip. The hardware chip may be an application-specific integrated circuit ASIC, a PLD, or a combination thereof. The PLD may be a CPLD, an FPGA, a GAL, or any combination thereof. The memory 802 may include a volatile memory such as a RAM, or the memory 802 may include a non-volatile memory such as a ROM, a flash memory, an HDD, or an SSD. Alternatively, the memory 802 may include a combination of the foregoing types of memories.

The memory 802 may be configured to store a program and a received packet.

The processor reads an instruction corresponding to the program from the memory 802, to perform the following operations:

receiving, by using the communications interface 803, a first source-tracing packet sent by a first router, where the first source-tracing packet is used to indicate that the first router is a source router generating a first routing information update packet; and determining that a third router adjacent to the apparatus has a source-tracing capability, and sending the first source-tracing packet to the third router by using the communications interface 803.

Optionally, the processor 801 is further configured to: determine that the third router does not have the source-tracing capability, and send the first routing information update packet to the third router by using the communications interface 803.

Optionally, the processor 801 is further configured to:

receive, by using the communications interface 803, a second routing information update packet sent by a fourth router;

determine that the fourth router does not have the source-tracing capability and a fifth router adjacent to the apparatus has the source-tracing capability, and generate a first source-tracing assistance packet, where the first source-tracing assistance packet is used to indicate that the fourth router is a source router generating the second routing information update packet; and send the first source-tracing assistance packet to the fifth router by using the communications interface 803.

Optionally, the processor 801 is further configured to:

receive, by using the communications interface 803, a second routing information update packet sent by a fourth router;

determine that a fifth router adjacent to the apparatus has the source-tracing capability, and generate a first source-tracing assistance packet, where the first source-tracing assistance packet is used to indicate that the fourth router is a source router generating the second routing information update packet; and send the first source-tracing assistance packet to the fifth router by using the communications interface 803.

Optionally, the processor 801 is further configured to:

receive a second source-tracing assistance packet and a second source-tracing packet by using the communications interface 803, where the second source-tracing assistance packet is used to indicate that a sixth router is a source router generating a fourth routing information update packet, and the second source-tracing packet is used to indicate that a seventh router is the source router generating the fourth routing information update packet; and determine, based on the second source-tracing packet, that the source router generating the fourth routing information update packet is the seventh router.

A bus may further be included in FIG. 8, and the bus may include any quantity of interconnected buses and bridges, and specifically link various circuits of one or more processors represented by the processor and a memory represented by the memory. The bus may further link various other circuits such as a peripheral device, a voltage stabilizer, and a power management circuit. The circuits are no longer further described in this specification. The communications interface provides a unit for communicating with various other devices on a transmission medium. The processor is responsible for bus architecture management and general processing. The memory may store data used when the processor performs an operation.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to this application without departing from the scope of this application. This application is intended to cover these modifications and variations provided that they fall within the scope of protection defined by the following claims.

What is claimed is:

1. A packet transmission method, comprising:
generating, by a first router, a first routing information update packet;
generating, by the first router, a first source-tracing packet for indicating the first router is a source router that generates the first routing information update packet;
determining, by the first router, a second router adjacent to the first router has a source-tracing capability; and
sending the first source-tracing packet to the second router.

2. The method according to claim 1, wherein determining, by the first router, a second router adjacent to the first router has a source-tracing capability comprises:
sending, by the first router, a first source-tracing capability negotiation packet to the second router for querying whether the second router has source-tracing capability; and
after receiving a first source-tracing capability acknowledgement packet from the second router, determining, by the first router, the second router has the source-tracing capability.

3. The method according to claim 1, further comprising:
receiving, by the first router, a second source-tracing capability negotiation packet from a third router, wherein the second source-tracing capability negotiation packet is used to query whether the first router has the source-tracing capability; and
sending, by the first router, a second source-tracing capability acknowledgement packet to the third router for indicating the first router has the source-tracing capability.

4. The method according to claim 3, wherein after sending, by the first router, a second source-tracing capability acknowledgement packet to the third router, the method further comprises:
receiving, by the first router, a second routing information update packet and a second source-tracing packet from the third router, the second source-tracing packet for indicating a source router that generates the second routing information update packet; and
determining, by the first router based on the second source-tracing packet, the source router that generates the second routing information update packet.

5. The method according to claim 1, further comprising:
receiving, by the first router, a third routing information update packet from a fourth router;
determining, by the first router, the fourth router does not have the source-tracing capability and a fifth router adjacent to the first router has the source-tracing capability;
generating a first source-tracing assistance packet for indicating the fourth router is a source router that generates the third routing information update packet; and
sending, by the first router, the first source-tracing assistance packet to the fifth router.

6. The method according to claim 1, further comprising:
obtaining, by the first router, a second source-tracing assistance packet and a third source-tracing packet, wherein the second source-tracing assistance packet is used to indicate that a sixth router is a source router that generates a fourth routing information update packet, and wherein the third source-tracing packet is used to indicate a seventh router is the source router that generates the fourth routing information update packet; and
determining, by the first router based on the third source-tracing packet, the source router that generates the fourth routing information update packet is the seventh router.

7. The method according to claim 1, wherein the first source-tracing capability negotiation packet includes source-tracing capability indication information.

8. A packet transmission method, comprising:
receiving, by a second router, a first source-tracing packet sent by a first router, wherein the first source-tracing packet is used to indicate that the first router is a source router that generates a first routing information update packet; and determining, by the second router, a third router adjacent to the second router does not have a source-tracing capability; and sending the first routing information update packet to the third router.

9. The method according to claim 8, wherein the first routing information update packet is a link state advertisement (LSA) packet or a link state protocol data unit (PDU) (LSP) packet.

10. The method according to claim 8, wherein the first source-tracing packet includes an identifier (ID) of the source router, a name of the source router, an Internet Protocol (IP) address of the source router, an ID of the first routing information update packet, a sequence number of the first routing information update packet, or combinations thereof.

11. A packet transmission apparatus disposed in a first router, the apparatus comprising:
a processor; and
memory coupled to the processor and configured to store instructions which, when executed by the processor, cause the apparatus to:
generate a first routing information update packet;
generate a first source-tracing packet for indicating the first router is a source router that generates the first routing information update packet; and
determine a second router adjacent to the apparatus has a source-tracing capability; and
send the first source-tracing packet to the second router.

12. The apparatus according to claim 11, wherein the instructions, when executed by the processor, further cause the apparatus to:
send a first source-tracing capability negotiation packet to the second router for querying whether the second router has source-tracing capability; and
after receiving a first source-tracing capability acknowledgement packet from the second router, determine the second router has the source-tracing capability.

13. The apparatus according to claim 11, wherein the instructions, when executed by the processor, further cause the apparatus to:
receive a second source-tracing capability negotiation packet from a third router, wherein the second source-tracing capability negotiation packet is used to query whether the first router has the source-tracing capability; and
send a second source-tracing capability acknowledgement packet to the third router for indicating the first router has the source-tracing capability.

14. The apparatus according to claim 13, wherein the instructions, when executed by the processor, further cause the apparatus to:
receive a second routing information update packet and a second source-tracing packet from the third router, wherein the second source-tracing packet is used to indicate a source router that generates the second routing information update packet; and
determine, based on the second source-tracing packet, the source router that generates the second routing information update packet.

15. The apparatus according to claim 11, wherein the instructions, when executed by the processor, further cause the apparatus to:
determine a fourth router does not have the source-tracing capability and a fifth router adjacent to the apparatus has the source-tracing capability;
generate a first source-tracing assistance packet for indicating the fourth router is a source router that generates a third routing information update packet; and
send the first source-tracing assistance packet to the fifth router.

16. The apparatus according to claim 11, wherein the instructions, when executed by the processor, further cause the apparatus to:
obtain a second source-tracing assistance packet and a third source-tracing packet, wherein the second source-tracing assistance packet is used to indicate a sixth router is a source router that generates a fourth routing information update packet, wherein and the third source-tracing packet is used to indicate that a seventh router is the source router that generates the fourth routing information update packet; and
determine, based on the third source-tracing packet, the source router that generates the fourth routing information update packet is the seventh router.

17. The apparatus according to claim 11, wherein the first source-tracing capability negotiation packet includes source-tracing capability indication information.

18. A packet transmission apparatus disposed in a second router, the apparatus comprising:
a processor; and
memory coupled to the processor and configured to store instructions which, when executed by the processor, cause the apparatus to:
receive a first source-tracing packet from a first router, wherein the first source-tracing packet is used to indicate the first router is a source router that generates a first routing information update packet;
determine a third router adjacent to the apparatus does not have a source-tracing capability; and
send the first routing information update packet to the third router.

19. The apparatus according to claim 18, wherein the first routing information update packet is a link state advertisement (LSA) packet or a link state protocol data unit (PDU) (LSP) packet.

20. The apparatus according to claim 18, wherein the first source-tracing packet includes an identifier (ID) of the source router, a name of the source router, an Internet Protocol (IP) address of the source router, an ID of the first routing information update packet, a sequence number of the first routing information update packet, or combinations thereof.

* * * * *